United States Patent [19]

Rodrigues

[11] Patent Number: 5,361,531
[45] Date of Patent: Nov. 8, 1994

[54] FISHING LURES

[76] Inventor: John Rodrigues, 730 Doan Dr., Burbank, Calif. 91506

[21] Appl. No.: 110,071

[22] Filed: Aug. 20, 1993

[51] Int. Cl.⁵ .................................................. A01K 85/00
[52] U.S. Cl. ..................................... 43/42.09; 43/42.28
[58] Field of Search .................. 43/42.09, 42.28, 42.29, 43/42.36

[56] References Cited

U.S. PATENT DOCUMENTS

| | | | |
|---|---|---|---|
| 2,625,767 | 1/1953 | Pokras | 43/42.09 |
| 3,169,336 | 2/1965 | Pope | 43/42.28 |
| 3,740,889 | 6/1973 | Scott | 43/42.09 |
| 4,831,768 | 5/1989 | Sorace | 43/42.09 |
| 4,831,770 | 5/1989 | Dworski | 43/42.28 |
| 5,113,607 | 5/1992 | Pate | 43/42.09 |
| 5,155,948 | 10/1992 | Kitagawa | 43/42.28 |
| 5,207,016 | 5/1993 | Pate | 43/42.28 |

*Primary Examiner*—Kurt C. Rowan
*Attorney, Agent, or Firm*—Wagner & Middlebrook

[57] ABSTRACT

A fishing lure includes a generally cylindrical body with a head end and a rear section, the head end being of larger diameter than the rear section. A plurality of bosses are formed on the surface of the rear section. A sleeve member consisting of a ring having a cut through its height and a lip around its periphery at one end surrounds the body at the smaller diameter end. One or more streamers are attached to the rear of the body. These streamers are of a generally known kind consisting of a flat plastic member having a large number of separated strands and an attachment end which is undivided and which is wrapped around the rear section of the lure. The attachment ends of the streamers for the lures of this invention are perforated or cut with cut outs or ports to match the bosses so that as they fit over these bosses as they are wrapped around the rear end of the body and are thereby partially held in place by the bosses. The sleeve member is slidable over the streamers and bosses to secure the streamer or streamers in place. This arrangement makes it possible to change streamers readily without removing the hook assembly or changing the entire lure.

A number of embodiments are disclosed showing variations in the shape and number of the bosses, kinds of hook arrangements, either a passageway through the axis of the lure for a leader or no such passageway and a loop at the front to fasten a leader. One embodiment shows a lure with a body and sleeve which are ovate or elliptical in cross section.

17 Claims, 2 Drawing Sheets

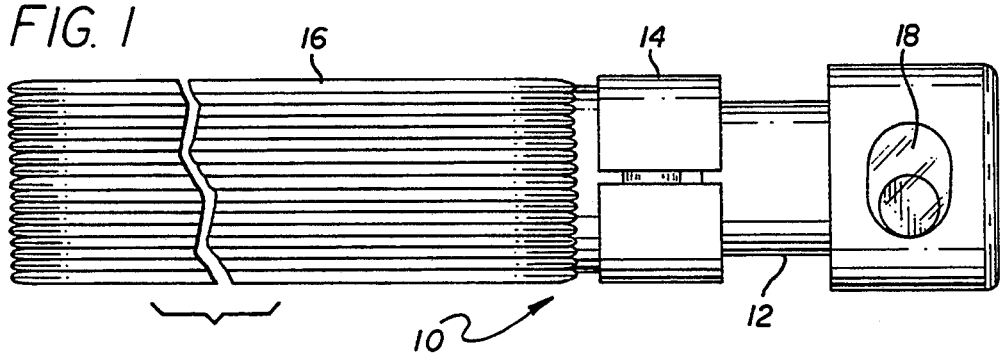
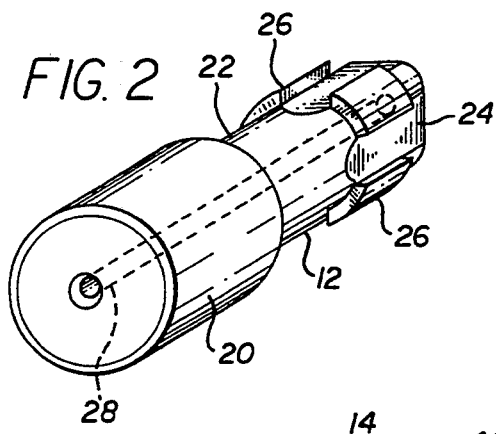
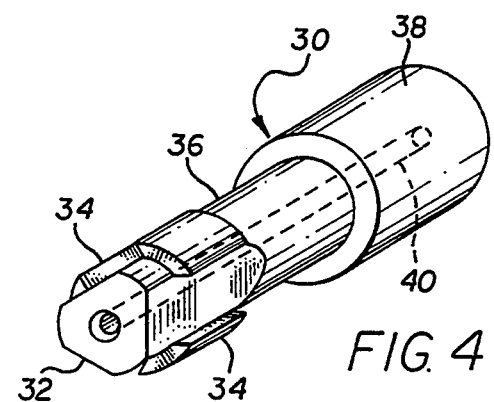
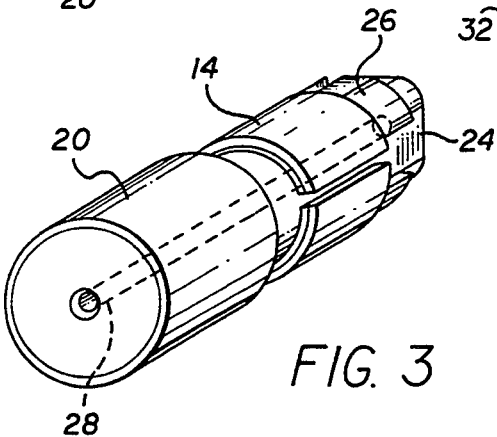
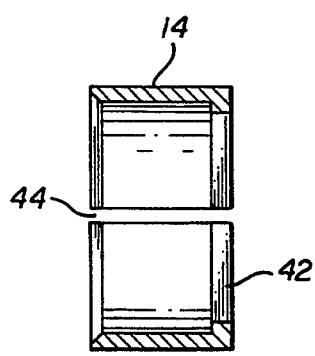

FISHING LURES

BACKGROUND OF THE INVENTION

This application relates to the field of sport fishing equipment, specifically to fishing lures having replaceable decorative and fish attracting skirts or shrouds to provide a wide selection of lures with a minimum of parts.

Fishing lures of many different appearances, and having removable and replaceable skirts or shrouds are well known. The skirts are available in a wide variety of colors and reflectivity such as to stimulate the bait fish in the area being fished and therefore to attract the desired game fish.

Applicant has found that during a fishing excursion extending several miles into the ocean, it is often desired to change the colors of the lures several times because of different lighting conditions (cloudy or bright), different feeding patterns, or because of fishing for different varieties and sizes of fish. The lures which are generally available do not permit convenient changes of the colored streamers or skirts and applicant has found it desirable to carry as many as 15-20 separate lures to deal with the conditions encountered in fishing tropical ocean waters. Such lures tend to be of significant size and weight and carrying such a large number has proven to be somewhat burdensome. Also, the task of changing lures is somewhat time consuming.

Through the past decades, a number of patents have been granted showing various method of attaching skirts or streamers to fishing lures. One method of mounting skirts or streamers to fishing lures is through the use of tying, wiring, taping or adhesively mounting the skirt directly to the head assembly as shown in U.S. Pat. No. 1,612,264 to Cressey, U.S. Pat. No. 1,688,110 to Bogart and U.S. Pat. No. 2,185,668 to Hurdle. In these designs, the skirt or streamer is not truly a replaceable structure and in order to change colors, the entire lure must be changed. Some improvements on this mounting method can be found in U.S. Pat. No. 3,359,674 to Strumor, U.S. Pat. No. 3,867,781 to Wolfe, U.S. Pat. No. 4,619,067 to West, U.S. Pat. No. 4,831,768 to Sorace, and U.S. Pat. No. 5,167,089 to Schriefer, all of which require the use of a carrier assembly onto which the streamer is permanently mounted. Although the mounting of the skirt on a carrier allows the colors to be more easily changed, these designs all necessitate the removal of the hook assembly from the main line in order to effect a color change.

Another type of structure shown in the literature makes use of conical bores and mating conical plugs as shown in U.S. Pat. Nos. 3,914,895 and 4,033,063, both to Mize. These designs rely on the pressure exerted by the towing vessel to keep the skirt assembly in place. These devices also require that the leader be detached from the hook in order to effect a color change.

U.S. Pat. No. 2,237,534 to Van Der Clute shows a skirt made of a tubular shaped member or collar having resilient streamer elements which are then attached to the head using a series of spring fingers to hold the collar member in place. It requires that this collar be permanently attached to the streamer assembly in order to retain a positive locking arrangement with the head assembly.

U.S. Pat. No. 2,625,767 to Pokras discloses a fishing lure which, when two halves of the head assembly are joined, has an axial bore through the center of the body. The tail section shows an axial bore through a carrier assembly onto which feathers or streamers are permanently bonded using adhesives. The tail assembly is then snapped into the head assembly locking it in place. This lock is maintained via the resiliency of the split sleeve. The method of changing the skirt requires that a force be applied to the sleeve at angles perpendicular to the assembly which then compresses the split sleeve. The force applied to this sleeve is done in the same manner of a fish closing its mouth on bait which could then cause the sleeve to loosen or fall off.

U.S. Pat. No. 3,740,889 to Scott shows a system in which a skirt or streamer is wrapped around the lure body and uses a sliding clamp arrangement to secure the streamer in place. The clamp is described as being of a resilient material such as a thermoplastic and relies on a frictional three to hold the streamer in place. This frictional force is applied in an area wherein it, in combination with the forces applied as a result of it movement through the water, could cause the streamer to weaken and tear. It is required that a transverse bead be molded into the streamer to secure it in a circumferential groove under the clamp.

Consideration of the disclosures of the above patents reveals that none show a really satisfactory and reliable arrangement for the removal and replacement of the skirts or streamers used in this class of lures. There is therefore a need for a lure design which permits the convenient and quick replacement of the skirts or streamers.

SUMMARY OF THE INVENTION

Applicant has devised a fishing lure which makes it possible, without removing the lure from the line or removing the hook assembly from the line, to conveniently change the streamers. This lure is formed of a generally cylindrical lure body having a constricted diameter center section and a rear section formed with a plurality of shallow bosses. The skirt or streamer, which is initially of a conventional design, is cut out or perforated in a pattern to match the bosses so that the skirt, when wrapped around the rear section, is held in place by the bosses. A cylindrical sleeve member is cut axially such that it will spring open as necessary to cover the skirt or streamer and the bosses, but tends to close around the skirt, preventing the skirt from slipping off the bosses. Because it may be desired to add more than one streamer to produce a multi-color effect, the bosses should be of such height as to carry two or even three streamers. The lure may be made with an axial passage for the leader, or with no such axial passage if it is desired to attach the lure at the end of the leader.

A number of possible configurations are shown. The bosses could be of many shapes and a number of arrangements for attaching the leader and for locating hooks are also shown.

BRIEF DESCRIPTION OF THE DRAWINGS

FIG. 1 is a side view of a fishing lure according to the invention;

FIG. 2 is a perspective view of the lure body of FIG. 1 with the sleeve removed;

FIG. 3 is a perspective view of the lure body of FIG. 1 with the sleeve attached;

FIG. 4 is a perspective view of the lure body for another embodiment of the invention;

FIG. 5 is a cross sectional view of the sleeve member of FIGS. 1 and 3;

DETAILED DESCRIPTION OF THE INVENTION

Figure 6:
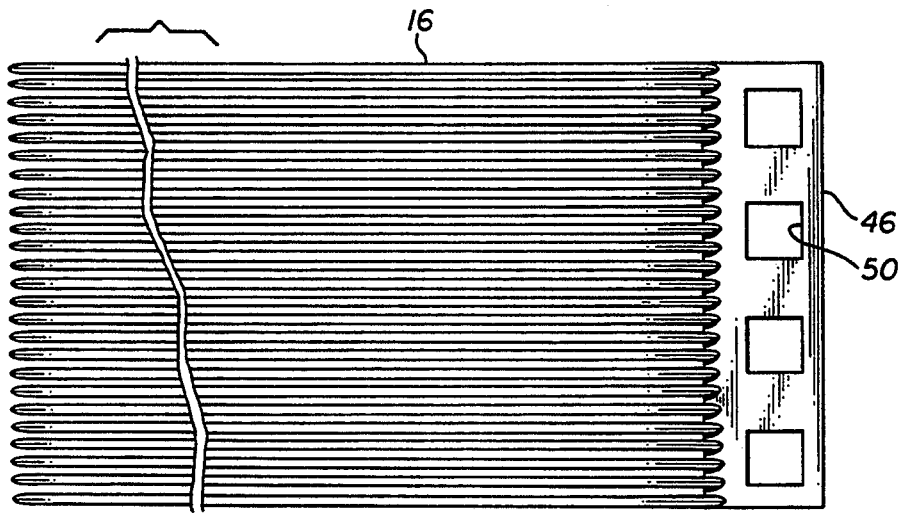
FIG. 6 is a plan view of a typical skirt or streamer used with the embodiment of FIGS. 1, 2, and 3.

Referring now to FIG. 1, the fishing lure 10 includes a main body 12, an axially movable sleeve member 14 and a skirt or streamer 16, normally of a flexible and elastic material such as rubber or a suitable thermoplastic. One or more such streamers 16 may be secured to the body 12. A decorative eye 18 may be attached to the body 12, as shown.

FIG. 2 is a perspective view of the body 12 by itself which is of generally cylindrical configuration including a head part 20, a reduced diameter center part 22 and a rear part 24. Rear part 24 has formed on its surface a plurality of (in this case four) raised bosses 26 which may be of square configuration or may be of other shapes as described below. A bore 28 passes through its axis of the body 12 for receiving a fishing leader (not shown).

FIG. 3 is a perspective view of the body 12 which is similar to FIG. 2 except that the sleeve 14 is shown in a position surrounding center part 22. In this position the bosses 26 are exposed and in position for streamers 16 to be attached.

FIG. 4 is a perspective of the lure body 30 of another embodiment of the invention. As compared with FIG. 2, the body is turned end-for-end with the rear portion 32 shown forward. This embodiment is very similar to that of FIG. 2 and 3 except that it shows only 3 bosses 34 rather than four and it is intended that this configuration be used for smaller lures. This embodiment also includes a reduced diameter center part 36, a head part 38, and an axial bore 40.

FIG. 5 is a cross sectional view of the sleeve member 14 which is a ring with a slight lip 42 on one face and a cut 44 extending from one face to the other. Cut 44 permits the sleeve member 14 to be expanded slightly as required to cover the streamers and the bosses, thereby preventing the steamers from slipping off the bosses as the lure is buffeted about when being trolled through the water. The sleeve configuration of FIG. 5 essentially is the same for all the embodiments described herein except for diameter and except for an embodiment using an ovate body, described below. Lip 42 serves as a stop to prevent sleeve 14 from sliding past its proper position.

FIG. 6 is a plan view of a skirt or streamer 16 according to the invention. It consists of a flat sheet of rubber or thermoplastic material, preferably molded, with an attachment part 46 and with strands 48 extending to the opposite end and including most of the length of the streamer. A plurality of cut outs or ports 50 in the attachment end match the shape and size of the bosses 26 of FIGS. 2 and 3, so that the streamer 16 may be wrapped around the rear part 24 of body 12 with bosses 26 extending through ports 50. The streamers for the configuration of FIG. 4 are smaller and contain only 3 such cut outs. As stated above, bosses 26 or bosses 34 should be of such height that two or possibly 3 streamers may be installed. The sleeve is slidable in an axial direction to cover the streamer or streamers and the bosses thereby securing the streamers in place. Other shapes of cut-outs are preferably used with bosses of different shapes such as those shown in FIGS. 9, 10A and 11A.

Figure 7:
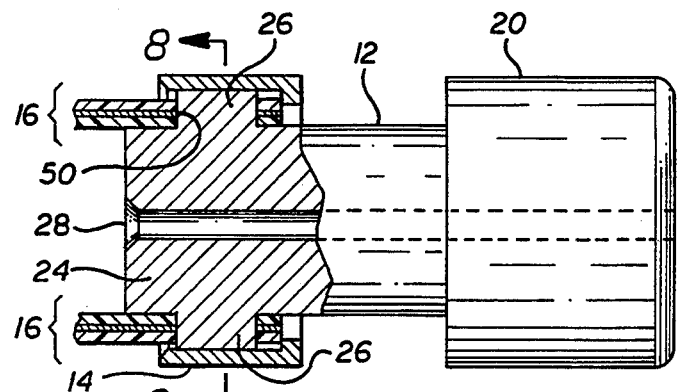
FIG. 7 is a side view, partly in section of the lure body of FIGS. 1 and 4 with streamers installed and the sleeve in place.

FIG. 7 is a side view, partly in section, of the body 12 with three streamers 16 installed and the sleeve member 14 in position securing the streamers to the body 12. Bosses 26 are shown extending through the cut outs 50 in the attachment part 46 of the streamers. Three such streamers 16 are shown, two typically being different colored plastic as described above and one being a thin sheet of mylar having a reflective surface to attract attention by flashing in the sunlight. Many such arrangements are possible and the configuration of the invention provides a convenient way to change such streamers as desired by simply sliding the sleeve 14 back over the center part of the body, unwrapping the streamer or streamers wrapping on one or more different ones, and sliding the sleeve 14 back over the newly installed streamers and the bosses 26. Obviously, changing streamers with the configuration of FIG. 4 is done in the same way.

Figure 8:
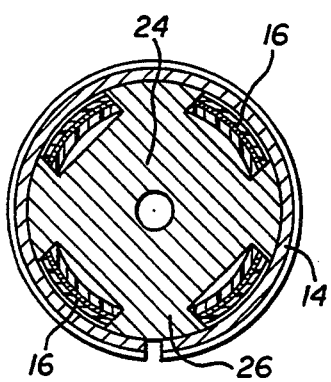
FIG. 8 is a cross sectional view taken along line 8—8 of FIG. 7.

FIG. 8 is a cross sectional view taken along line 8–8 of FIG. 7, and shows the rear part 24 with bosses 26, two skirts 16 and the sleeve member 14 in place. In will be recognized that the clearances between the parts in FIGS. 7 and 8 are exaggerated for clarity.

Figure 9:
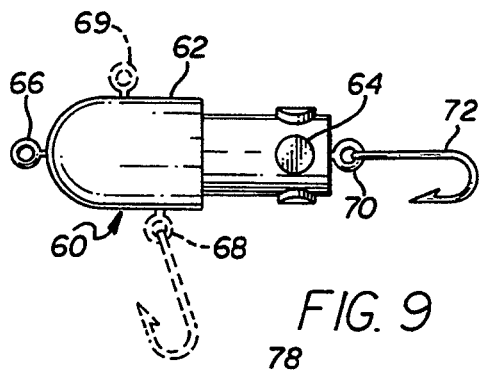
FIG. 9 is a side view of an alternate embodiment of the invention.

FIG. 9 is a side view of an alternate embodiment with the sleeve member omitted for clarity. In this embodiment, the body 60 includes a head 62, a rear section including bosses 64 which are circular in plan view, and an attached loop 66 for attachment to a leader. No axial passageway is used. An additional loop or loops 68 may be included as attachments for multiple hooks. Loop 69 provides an alternate position for the attachment of the leader and loop 70 provides a means for attaching a hook 72. The streamers 16, which for this embodiment should have circular cut outs, are installed as described above and secured by a sleeve member 14.

Figure 10A:
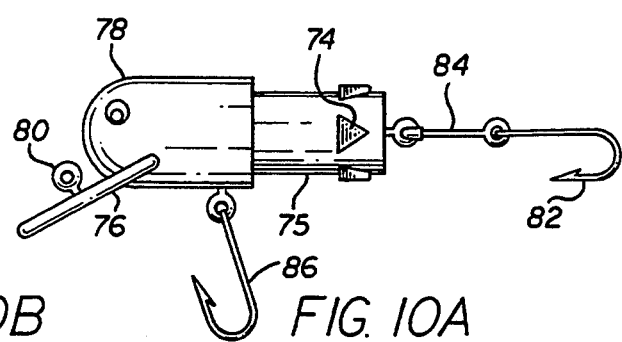
FIG. 10A is a side view of an additional alternate embodiment of the invention.

FIG. 10A is a side view of an additional alternate embodiment which is similar to FIG. 9 in that no axial passageway is used. Again, the sleeve member is omitted for clarity. This embodiment uses triangular bosses 74 on body 75 which preferably would require matching triangular cut outs in the attachment part 46 of the streamers. This embodiment utilizes a diving plane 76 attached to the head portion 78 and a loop 80 is fastened to diving plane 74 for attachment to a leader. This attachment means will cause the lure to be quite active in the water during trolling. The primary hook 82 is shown connected to the rear of body 75 through an extension 84. An alternate or second hook 86 is attached at the side of body 75.

Figure 11A:
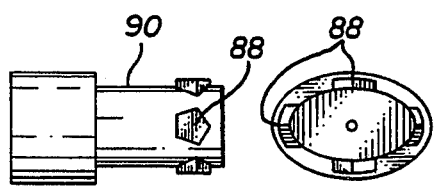
FIG. 11A is a side view of still another embodiment of the invention.
Figure 11B:
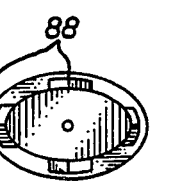
FIG. 11B is a rear end view of the embodiment of FIG. 11.
Figures 10B, 11C:
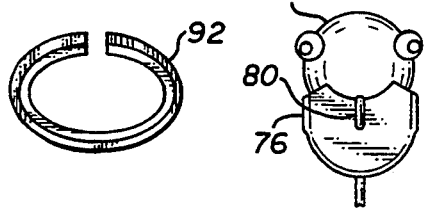
FIG. 10B is a front view of the embodiment of FIG. 10A.
FIG. 11C is an end view of the sleeve used in combination with the embodiment of FIGS. 11A and 11B.

FIG. 10B is a front view of the embodiment of FIG. 10A. This view shows prominent decorative eyes 87, the use of which is optional.

The embodiment of FIG. 11A is similar to that of FIG. 2 except that it is ovate or elliptical in cross section as shown in FIG. 11B. The ovate cross section gives the lure a somewhat different action in the water from a lure with a cylindrical cross section. Also the bosses 88 on body 90 are pentagonal in shape which would require pentagonal cut-outs in the attachment part 46 of the streamers used with this embodiment. FIG. 11C is an end view of the ovate sleeve 92 used with the embodiment of FIGS. 11A and 11B.

It will be appreciated that the several embodiments shown are exemplary and that many different combinations are quite operative. Any of the boss configurations may be used with any of the body configurations shown. Alternate head configurations may be used with any of the body configurations shown. The above described embodiments are therefore not to be considered limiting and the scope of the invention shall be determined from the scope of the following claims including their equivalents.

What is claimed is:

1. A fishing lure comprising a body having a head portion and a rear portion, a flexible streamer member including an attachment portion attached to said rear portion and a plurality of strands,
    characterized in that said rear portion includes a plurality of upstanding bosses,
    said streamer member includes cut-outs which fit over said bosses, and
    a sleeve member is included encircling said body and movable to cover said attachment portion and said bosses or movable in the opposite direction to uncover said attachment portion to permit removal of said streamer member.

2. A fishing lure as claimed in claim 1 wherein said sleeve member includes an opening to permit said sleeve member to expand to cover said bosses and said streamer member.

3. A fishing lure as claimed in claim 1 wherein said body is generally cylindrical and said rear portion has a smaller diameter than said head portion.

4. A fishing lure as claimed in claim 3 wherein said sleeve is generally cylindrical and a smaller diameter lip is formed at one end thereof.

5. A fishing lure as claimed in claim 1 wherein said body and said sleeve member are ovate in cross section.

6. A fishing lure as claimed in claim 1 wherein said bosses are circular in plan view.

7. A fishing lure as claimed in claim 1 wherein said bosses are substantially square in plan view.

8. A fishing lure as claimed in claim 1 wherein said body includes an axial passage therethrough.

9. A fishing lure as claimed in claim 1 wherein the height of said bosses is greater than the thickness of two of said attachment portions.

10. A fishing lure comprising a generally cylindrical body including a head portion, a rear portion of smaller diameter than said head portion, and a plurality of upstanding bosses on said rear portion;
    a streamer member of flexible material having an attachment section including a plurality of cut outs which fit over and are carried on said bosses and a large number of strands which extend beyond said body;
    and a sleeve member which is slidable to cover said attachment section and said bosses to secure said streamer member to said body.

11. A fishing lure as claimed in claim 10 wherein said sleeve member includes an opening to permit said sleeve member to expand to cover said bosses and said streamer members.

12. A fishing lure as claimed in claim 10 wherein said sleeve is generally cylindrical and a smaller diameter lip is formed at one end thereof.

13. A fishing lure as claimed in claim 10 wherein said bosses are circular in plan view.

14. A fishing lure as claimed in claim 10 wherein said bosses are substantially square in plan view.

15. A fishing lure as claimed in claim 10 wherein said bosses are substantially pentagonal in plan view.

16. A fishing lure as claimed in claim 10 wherein said bosses are substantially trianglular in plan view.

17. A fishing lure as claimed in claim 10 wherein the height of said bosses is approximately the thickness of two of said attachment portions.

* * * * *